Patented Mar. 29, 1949

2,465,951

UNITED STATES PATENT OFFICE 2,465,951

METHOD OF MAKING PARA-NITROBENZENE SULFONYL CHLORIDE

Michael Witte, Eden, N. Y., assignor to Allied Chemical & Dye Corporation, New York, N. Y., a corporation of New York No Drawing. Application June 7, 1946, Serial No. 675,294

7 Claims. (Cl. 260—543)

This invention relates to an improved process for the manufacture of para-nitrobenzene sulfonyl chloride from di-para-nitrophenyl disulfide. Para-nitrobenzene sulfonyl chloride is an important intermediate for the preparation of drugs of the sulfanilamide series which have attained, of late years, great importance in therapeutics.

It was known heretofore to prepare para-nitrobenzene sulfonyl chloride from di-para-nitrophenyl disulfide (the latter intermediate can be obtained from para-nitro-chlorobenzene by reaction with sodium sulfide and sulfur in aqueous alcoholic solution, as disclosed by Bell in Journal of the Chemical Society (1928), page 2776). Thus, para-nitrobenzene sulfonyl chloride has been prepared by oxidizing di-para-nitrophenyl disulfide, for example, with fuming nitric acid, neutralizing the resulting sulfonic acid with ammonium hydroxide (after filtering off insoluble material) and reacting the resulting ammonium salt in crystalline form with chlorsulfonic acid. This procedure, however, is relatively uneconomical because of the intermediate preparation of the sulfonic acid and its ammonium salt in the solid form, and the relatively large amount of chlorsulfonic acid required.

Zincke discloses in Annalen, 400 (1913), page 10, that para-nitrobenzene sulfonyl chloride can be readily obtained by treatment of di-para-nitrophenyl disulfide, suspended in glacial acetic acid, with moist chlorine. However, the yields obtained in this process are low.

It was also known to prepare ortho-nitrobenbene sulfonyl chloride according to Fierz (Helv. Chim. Acta, 12 (1929), page 667) by passing gaseous chlorine into a suspension of di-ortho-nitrophenyl disulfide in a mixture of concentrated hydrochloric and nitric acids. Ortho-nitrobenzene sulfonyl chloride, which is formed from the di-ortho-nitrophenyl disulfide and recrystallized from glacial acetic acid, is said to be obtained in a yield of about 80% of theory. Similar results, however, are not produced when this process is applied to di-para-nitrophenyl disulfide; the yield of para-nitrobenzene sulfonyl chloride obtained by such procedure amounts to less than 40% of theory.

In co-pending application Serial No. 675,295 of June 7, 1946, entitled "manufacture of para-nitrobenzene sulfonyl chloride," filed by the applicant herein jointly with Morton G. Welge, a process is described for the preparation of para-nitrobenzene sulfonyl chloride by reaction of di-para-nitrophenyl disulfide with chlorine in the presence of nitric acid, hydrochloric acid, and a solvent which is liquid, substantially inert, and substantially immiscible with the aforesaid acids under the conditions of the reaction and which is a solvent for para-nitrobenzene sulfonyl chloride. In carrying out the process of the co-pending application, di-para-nitrophenyl disulfide is suspended in a mixture of nitric and hydrochloric acids, preferably containing at least one mol of nitric acid and at least 5 mols of hydrochloric acid per mol of di-para-nitrophenyl disulfide, in the presence of a solvent in amount sufficient to dissolve the para-nitrobenzene sulfonyl chloride which is formed but preferably insufficient to dissolve a substantial proportion of the disulfide. Chlorine is passed into the mixture, preferably at a temperature of 50° C. to 65° C., until the di-para-nitrophenyl disulfide is substantially completely reacted. Treatment with chlorine in this manner, as illustrated in the examples of the aforesaid application, requires approximately 4 to 6 hours. The para-nitrobenzene sulfonyl chloride which is formed is contained in solution in the solvent, and can be recovered therefrom in yields of the order of 75% of theory.

I have now found that di-para-nitrophenyl disulfide can be converted in good yields to para-nitrobenzene sulfonyl chloride merely by reaction with a mixture of concentrated nitric and hydrochloric acids in the presence of a solvent for para-nitrobenzene sulfonyl chloride, which is liquid, substantially inert and substantially immiscible with the aqueous acid mixture under the conditions of the reaction, without adding molecular chlorine to the reaction mixture. Thus, all of the chlorine required for the reaction is generated in situ. Completion of the reaction under these conditions requires a relatively short reaction period, for example, only about 1 to 1½ hours at 50° C. to 65° C. The para-nitrobenzene sulfonyl chloride which is subsequently recovered from its solution in the immiscible solvent is of excellent quality.

The over-all reaction involved in conversion of di-para-nitrophenyl disulfide to para-nitrobenzene sulfonyl chloride upon treatment with nitric acid and hydrochloric acid probably takes place mainly in accordance with the following equation:

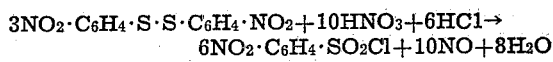

$3NO_2 \cdot C_6H_4 \cdot S \cdot S \cdot C_6H_4 \cdot NO_2 + 10HNO_3 + 6HCl \rightarrow$
$6NO_2 \cdot C_6H_4 \cdot SO_2Cl + 10NO + 8H_2O$ Thus, at least 3⅓ mols of $HNO_3$ and 2 mols of HCl are required theoretically for the conversion of one mol of di-para-nitrophenyl disulfide to para-nitrobenzene sulfonyl chloride. The theoretical proportions may be used but it is preferred to employ at least 5 mols of nitric acid and at least 3 mols of hydrochloric acid per mol of di-para-nitrophenyl disulfide. The initial aggregate concentration of the mixture of hydrochloric and nitric acids employed should not be substantially less than 35% by weight, and is preferably between 40% and 50%. Larger amounts, and higher initial aggregate concentrations of the aforesaid acids, for example up to about 55%, can be employed without altering the course of the reaction but provide no substantial advantage to offset the expense of the additional materials employed. The aggregate concentration of the mixture of hydrochloric and nitric acids at the end of the reaction should preferably not fall below 25%.

In carrying out the reaction, hydrochloric acid and nitric acid can be added by increments to a suspension of di-para-nitrophenyl disulfide in one or both of the aforesaid acids together with an immiscible solvent as hereinbefore defined, so that the reaction products of hydrochloric and nitric acids are progressively generated in the presence of di-para-nitrophenyl disulfide, resulting in a smooth and efficient reaction.

Suitable organic solvents for use in the process are those listed in the Witte and Welge application, e. g. low-boiling aliphatic hydrocarbons such as ligroin, petroleum heptane or petroleum ether, aromatic compounds such as benzene, toluene or xylene, nitrobenzene and mono- or dichlorobenzene, and the like. The organic solvents employed in accordance with this invention may be single compounds, or mixtures of two or more compounds.

Liquid aromatic hydrocarbons, particularly benzene, are preferred because of their volatility, their excellent solvent power for para-nitrobenzene sulfonyl chloride and their relatively low cost. Preferably an amount of solvent is employed at least sufficient to dissolve all of the para-nitrobenzene sulfonyl chloride which is formed but insufficient to dissolve a substantial proportion of the disulfide. For example, from 5 parts to 20 parts, preferably about 8 parts, by weight of a liquid aromatic hydrocarbon with the solvency of benzene may be employed to advantage for each 4 parts by weight of di-para-nitrophenyl disulfide.

The reaction according to the invention can be carried out by agitating the reaction mixture at a temperature substantially within the range 25° to 100° C., but is preferably effected between 50° C. and 65° C. At temperatures below about 25° C. the reaction becomes too slow and requires too long a period to be economically operated, whereas at temperatures above about 100° C., decomposition of the reaction product and other side reactions are accelerated, causing a substantial decrease in the yield of para-nitrobenzene sulfonyl chloride.

At temperatures within the preferred range of 50° to 65° C. the reaction is preferably allowed to continue for about 1 to 2 hours. It has been found that a decrease rather than an increase in yield of para-nitrobenzene sulfonyl chloride results from prolonging the reaction period substantially beyond the aforesaid limit, probably as a result of decomposition of para-nitrobenzene sulfonyl chloride already formed.

Recovery of para-nitrobenzene sulfonyl chloride from the reaction-mixture is accomplished by separating the organic solvent phase from the reaction mixture and recovering para-nitrobenzene sulfonyl chloride from solution in the solvent by various methods. Thus, when a solvent of low or moderate solvency for para-nitrobenzene sulfonyl chloride is employed, the product of the reaction can be isolated by cooling the solution, or by first concentrating by evaporation and then cooling the concentrated solution, and separating the para-nitrobenzene sulfonyl chloride which crystallizes out by filtration. The product may then be recrystallized from a further quantity of a similar solvent.

When a solvent of high solvency is employed the non-aqueous phase can be diluted (or concentrated and then diluted) with a solvent of low solvency (such as a relatively volatile non-aromatic hydrocarbon mixture, for instance, an aliphatic hydrocarbon petroleum fraction boiling within the range 40° to 210° C.) to effect precipitation of the para-nitrobenzene sulfonyl chloride. The product is then recovered in crystalline form by cooling the diluted mixture and filtering out the crystalline product, which may be further purified by recrystallizing from an additional quantity of a similar solvent or by extracting it with a paraffinic hydrocarbon at a temperature sufficient to maintain the para-nitrobenzene sulfonyl chloride in a molten state, in an apparatus adapted for solvent extraction of liquids. Upon cooling the extract, crystalline para-nitrobenzene sulfonyl chloride is precipitated and can be recovered by filtration in the form of a filter cake. The product thus obtained is free of any impurities which are precipitated by dilution of the concentrated non-aqueous liquid phase of the reaction mixture, and which are soluble in the paraffinic hydrocarbon.

As another alternative recovery method the non-aqueous phase can be evaporated so as to remove all of the solvent, thus yielding crude para-nitrobenzene sulfonyl chloride in the form of a solid residue. The crude para-nitrobenzene sulfonyl chloride thus obtained can be recrystallized from a liquid paraffinic hydrocarbon of the type described above, or it can be subjected to extraction with a paraffinic hydrocarbon in the same manner as the product obtained by concentrating the non-aqueous liquid phase of the reaction mixture and diluting the concentrate with a paraffinic hydrocarbon, as hereinbefore described.

The process of this invention is illustrated by the following example wherein parts and percentages are by weight and temperatures are in degrees centigrade.

*Example*

308 parts of crude di-para-nitrophenyl disulfide (containing approximately 80% of pure di-para-nitrophenyl disulfide, and obtained by boiling para-nitro-chlorbenzene with sodium sulfide, sulfur and aqueous alcohol, cooling and filtering the reaction mixture, washing the resulting filter cake with water until free of water-soluble salts and then drying) was mixed with 928 parts of 20° Bé. (31.45%) hydrochloric acid and 527 parts of benzene in the reaction vessel equipped with reflux condenser and an agitator. The mixture was agitated, and 422 parts of 67% nitric acid was added to the mixture. The mixture thus formed contained about 5.6 mols of $HNO_3$ and about 10 mols of HCl per mol of di-para-nitrophenyl disulfide. The temperature of the resulting slurry rose spontaneously to 50° to 55° during about ½ hour, after which the reaction mass was agitated and heated at 55° to 60° for approximately one hour. The mixture was then allowed to stratify, and the upper non-aqueous layer (containing para-nitrobenzene sulfonyl chloride in solution in benzene) was separated from the lower aqueous layer. The benzene solution, thus separated, was distilled to remove about one-half of the benzene contained therein, and the residue was cooled with agitation to about 5° on an ice bath, and diluted with about 500 parts of a light petroleum distillate (e. g. a paraffinic petroleum oil fraction of A.P.I. gravity 74.4 at 60° C., boiling at about 60° to 71° C. and essentially normal hexane). The resulting mixture was agitated on the ice bath for about 15 minutes to effect precipitation of para-nitrobenzene sulfonyl chloride, and the latter was separated by filtration from the mixture in the form of a filter cake. The resulting filter cake was purified by extraction with about 20 times its weight of Skellysolve B in an apparatus equipped for distillation and recycling of the extraction solvent, extraction being discontinued when a sample of the extract no longer yielded crystals when cooled to 25°. The extract was then cooled to 0° to 5° and maintained at this temperature for about one hour. The resulting crystals of para-nitrobenzene sulfonyl chloride were filtered from the mother liquor and dried. 212 parts of para-nitrobenzene sulfonyl chloride melting at 74.5 to 78° were obtained, corresponding to about 60% of the yield theoretically obtainable from the di-para-nitrophenyl disulfide employed.

Variations and modifications may be made in the process hereinbefore described without departing from the scope of the invention. Thus, by substituting 1000 parts of a light petroleum distillate composed essentially of aliphatic hydrocarbons and having a boiling range of 90° to 100° C. in place of benzene in the preceding example, a substantially equal yield of the desired para-nitrophenyl sulfonyl chloride may be obtained.

I claim:

1. A process for the manufacture of para-nitrobenzene sulfonyl chloride without the use of gaseous chlorine, which comprises reacting di-para-nitrophenyl disulfide with a mixture of aqueous nitric and hydrochloric acids in the presence of a solvent for para-nitrobenzene sulfonyl chloride which is liquid, substantially inert and substantially immiscible with said acids under the conditions of reaction, said mixture containing at least 3⅓ mols of HNO₃ and at least 2 mols of HCl per mol of di-para-nitrophenyl disulfide.

2. A process for the manufacture of para-nitrobenzene sulfonyl chloride without the use of gaseous chlorine, which comprises reacting di-para-nitrophenyl disulfide with a mixture of aqueous concentrated nitric and hydrochloric acids in a mol ratio between about 5:3 and about 3:10 in the presence of a solvent for para-nitrobenzene sulfonyl chloride which is liquid, substantially inert and substantially immiscible with said acids under the conditions of reaction, said mixture containing at least 3⅓ mols of HNO₃ and at least 2 mols of HCl per mol of di-para-nitrophenyl disulfide, and the amount of said solvent being sufficient to dissolve all of the para-nitrobenzene sulfonyl chloride which is formed but insufficient to dissolve a substantial proportion of the disulfide.

3. A process for the manufacture of para-nitrobenzene sulfonyl chloride without the use of gaseous chlorine, which comprises reacting di-para-nitrophenyl disulfide with a mixture of aqueous concentrated nitric and hydrochloric acids at a temperature substantially within the range 25° to 100° C. in the presence of a solvent for para-nitrobenzene sulfonyl chloride, which is liquid, substantially inert, and substantially immiscible with said acid mixture under the conditions of the reaction, said mixture containing at least 3⅓ mols of HNO₃ and at least 2 moles of HCl per mol of di-para-nitrophenyl disulfide.

4. A process for the manufacture of para-nitrobenzene sulfonyl chloride without the use of gaseous chlorine, which comprises reacting di-para-nitrophenyl disulfide with a mixture of aqueous concentrated nitric and hydrochloric acids in a mol ratio between about 5:3 and about 3:10 at a temperature substantially within the range 25° to 100° C. in the presence of a solvent for para-nitrobenzene sulfonyl chloride which is liquid, substantially inert and substantially immiscible with said acid mixture under the conditions of the reaction, said mixture containing at least 3⅓ mols of HNO₃ and at least 2 mols of HCl per mol of di-para-nitrophenyl disulfide, and the amount of said solvent being sufficient to dissolve substantially all of the para-nitrobenzene sulfonyl chloride which is formed but insufficient to dissolve a substantial proportion of the disulfide.

5. A process for the manufacture of para-nitrobenzene sulfonyl chloride without the use of gaseous chlorine, which comprises reacting di-para-nitrophenyl disulfide with a mixture of aqueous concentrated nitric and hydrochloric acids at a temperature between 50° C. and 65° C. in the presence of an aromatic solvent for para-nitrobenzene sulfonyl chloride which is liquid, substantially inert and substantially immiscible with said acid mixture under the conditions of the reaction, said mixture containing at least 5 mols of HNO₃ and 3 mols of HCl per mol of di-para-nitrophenyl disulfide and at least 5 parts by weight of said solvent for each 4 parts by weight of di-para-nitrophenyl disulfide.

6. A process for the manufacture of para-nitrobenzene sulfonyl chloride without the use of gaseous chlorine, which comprises forming a mixture of aqueous concentrated nitric and hydrochloric acids in a mol ratio of about 1:2 and the aggregate concentration of which is at least 35%, reacting di-para-nitrophenyl disulfide with said acid mixture at a temperature between 50° C. and 65° C. in the presence of a liquid aromatic hydrocarbon, said mixture containing at least 5 mols of HNO₃ per mol of di-para-nitrophenyl disulfide and about 2 parts by weight of said aromatic hydrocarbon per part by weight of di-para-nitrophenyl disulfide.

7. A process for the manufacture of para-nitrobenzene sulfonyl chloride without the use of gaseous chlorine, which comprises forming a mixture of concentrated nitric and hydrochloric acids, the aggregate concentration of which is initially between 40% and 50%, and reacting di-para-nitrophenyl disulfide with said mixture of acids at a temperature between 50° C. and 65° C. for a period of about one hour, in the presence of about 2 parts by weight of benzene per part by weight of di-para-nitrophenyl disulfide, said acid mixture initially containing about 5 mols of HNO₃ and about 10 mols of HCl per mol of di-para-nitrophenyl disulfide.

MICHAEL WITTE.

REFERENCES CITED

The following references are of record in the file of this patent:

UNITED STATES PATENTS

| Number | Name | Date |
| --- | --- | --- |
| 2,277,325 | Heuter | Mar. 14, 1942 |

OTHER REFERENCES

Fierz; Helv. Chim. Acta, vol. 12, 1929, p. 667.
Bell; J. Chem. Soc. (London), 1928, p. 2776.